(12) United States Patent
Lodhia et al.

(10) Patent No.: US 10,902,254 B2
(45) Date of Patent: Jan. 26, 2021

(54) CONVERTING A CAPTURED IMAGE OF A LAYOUT TO A STRUCTURED DOCUMENT TEMPLATE

(71) Applicant: salesforce.com, inc., San Francisco, CA (US)

(72) Inventors: Rahmaan Lodhia, Johns Creek, GA (US); Jeffrey Geiger, Denver, CO (US); Michael Diffenderfer, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/196,378

(22) Filed: Nov. 20, 2018

(65) Prior Publication Data

US 2020/0097719 A1    Mar. 26, 2020

Related U.S. Application Data

(60) Provisional application No. 62/736,996, filed on Sep. 26, 2018.

(51) Int. Cl.
*G06F 17/00* (2019.01)
*G06K 9/00* (2006.01)
(Continued)

(52) U.S. Cl.
CPC ....... *G06K 9/00476* (2013.01); *G06F 40/106* (2020.01); *G06F 40/14* (2020.01); *G06F 40/186* (2020.01); *G06K 9/00463* (2013.01); *G06K 9/00469* (2013.01); *G06K 9/6217* (2013.01); *G06N 20/00* (2019.01); *G06T 7/70* (2017.01);
(Continued)

(58) Field of Classification Search
CPC ..... G06F 17/248; G06F 17/242; G06F 17/212
See application file for complete search history.

(56) References Cited

U.S. PATENT DOCUMENTS 5,455,898 A * 10/1995 Mahoney ........... G06K 9/00442
715/209
5,577,188 A    11/1996 Zhu
(Continued)

OTHER PUBLICATIONS

Kaehler et al., "Learning OpenCV3" copyright 2017, p. 770-798 (Year: 2017).*
(Continued)

*Primary Examiner* — Amelia L Tapp
(74) *Attorney, Agent, or Firm* — Dergosits & Noah LLP; Todd A. Noah

(57) ABSTRACT

Described is a system and method for converting a drawing (or captured image) of a layout using a trained image analysis model (or engine) into a structured document template. The mechanism may allow a user to create a hand-drawn diagram of a layout that can be automatically converted into a template for a document. For example, the hand-drawn diagram may be of a layout for an email which the mechanism may automatically convert into HTML code for an email template within a building tool. The building tool may then use the converted email template as part of an automated email marketing procedure. Accordingly, the mechanism provides the ability for a user to conveniently create a template and forego the process of using only programming code or visual tools.

17 Claims, 12 Drawing Sheets

US 10,902,254 B2

Page 2

(51) Int. Cl.
  *G06T 7/70* (2017.01)
  *G06K 9/62* (2006.01)
  *G06N 20/00* (2019.01)
  *G06F 40/14* (2020.01)
  *G06F 40/106* (2020.01)
  *G06F 40/186* (2020.01)

(52) U.S. Cl.
  CPC .............. G06K 2209/01 (2013.01); G06T 2207/30176 (2013.01)

(56) References Cited

U.S. PATENT DOCUMENTS

| | | |
|---|---|---|
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,727 B1 * | 11/2004 | Mohr ............... G06F 17/211 382/180 |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,437,914 B2 * | 10/2019 | Zukerman ............. G06F 16/986 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0215139 A1 * | 11/2003 | Shilman ............. G06K 9/00409 382/186 |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0089660 A1 * | 4/2009 | Atkins ................. G06Q 50/10 715/243 |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |

(56) References Cited

U.S. PATENT DOCUMENTS

| | | |
|---|---|---|
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0121305 A1* | 4/2015 | Saund ............... G06Q 10/107 715/810 |
| 2015/0172563 A1 | 6/2015 | Jakobson et al. |

OTHER PUBLICATIONS

Zang et al., "SketchNet: Sketch Classification with Web Images," 2016 IEEE Conference on Computer Vision and Pattern Recognition, CVPR 2016, p. 1105-1113. (Year: 2016).*

Ahmad et al., Data augmentation-assisted deep learning of hand-drawn partially colored sketches for visual search, copyright Aug. 2017, p. 1-19. (Year: 2017).*

* cited by examiner

200

Engagement Studio
  Demo Program
Build | Test | Report | Activity        ← 201

Template Information

Name    [Demo Program Email]

Folder  [            ]  [Choose]

Email Type    ● HTML and Text
              ○ Text

Available For  ● One to One Emails
               ○ Autoresponder Emails
               ● List Emails
               ○ Engagement Program Emails

Engagement Studio
Demo Program Email

Visual Preview | HTML

— 525

```
<html xmlns="http://www.w3.org" lang="eng"
<head>
        <meta http-equiv="Content-Type" content="text/html;" />
</head>
<body>
<style type="text/css">.preview.container {
            position: relative;
            }
            .image-placeholder {
                    height: 180px;
                    margin: 5px;
                    width: 260px;
            }

.
                        .
                        .
                        .

.image-placeholder h4 {
                    align-self: center;
                    text-align: center;
            }
```

FIG. 5B

CONVERTING A CAPTURED IMAGE OF A LAYOUT TO A STRUCTURED DOCUMENT TEMPLATE

RELATED APPLICATIONS

This application claims the benefit of U.S. Provisional Patent Application No. 62/736,996, filed Sep. 26, 2018, the entirety of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This disclosure relates to a building tool, and more particularly, providing the ability to automatically convert an image of a layout into a document template.

BACKGROUND

Various customer relationship management (CRM) software tools exist to aid organizations with managing interactions with customers and potential customers. These tools often include capabilities that allow an organization to create a program to automate various tasks. For example, these tools may be used to create a program to automate various marketing tasks. As one example, an automation builder may allow a user (e.g. marketing professional) to create templates for an automated email marketing campaign. Such an automation tool, however, may require a certain degree of programming acumen and effort. Accordingly, the potential user base for such a program may be limited to users that are comfortable working in a programming environment, or have been adequately trained to work within such an environment. For example, in the context of an automated email marketing program, marketing professionals may have to defer the creation of email templates to a development team. Naturally, utilization of a development team increases the resources required for such an endeavor. Accordingly, there is a need to further provide user-friendly capabilities and functionality for automation tools to increase the potential user base for such tools.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 2 is a diagram illustrating an example building tool interface used to create a document template according to one or more embodiments of the disclosure.

FIG. 5B is a diagram illustrating an example interface showing a markup language preview after converting the image of the hand-drawn layout into a template according to one or more embodiments of the disclosure.

DETAILED DESCRIPTION

Figure 1:
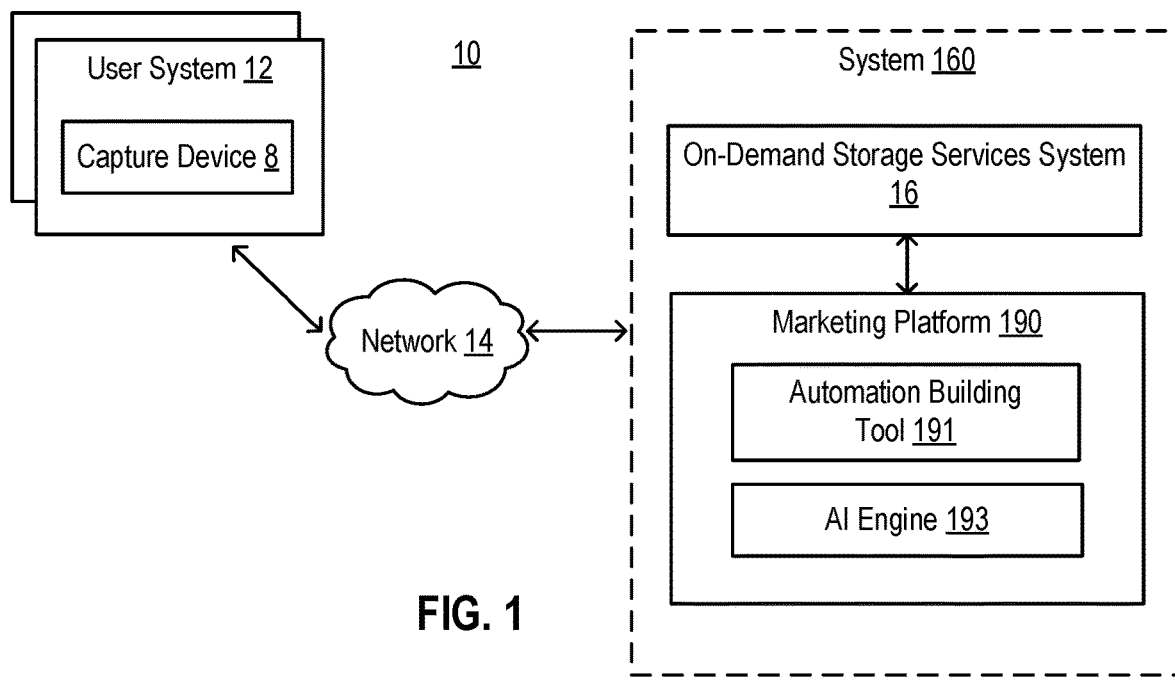
FIG. 1 is a block diagram illustrating an example overview of an operating environment for converting an image into a document template for a building tool according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a mechanism that converts a drawing (or captured image) of a layout into a structured document template. For example, the document (or document) may include any types of digital material such as digital marketing material including an email, webpage, flyer, article, etc. In some embodiments, the mechanism may allow a user to create a hand-drawn diagram of a layout that can automatically be converted (e.g. using trained image analysis model) into the document template within a tool that is used to create an automated program. For example, the hand-drawn diagram may be of a layout for an email which the mechanism may automatically convert into Hypertext Markup Language (HTML) for an email template within a building tool. Accordingly, the building tool may use the converted email template as part of an automated email marketing procedure.

In some embodiments, the mechanism may convert various aspects of a hand-drawn layout into a template. For example, these aspects may include any positioning of content such as text, images, multimedia, etc., as well as a general structure for the layout such a column positions, headings, etc. In addition, the hand-drawn layout may specify various tags or elements that may be used by a markup language (e.g. heading, title, etc.). In order to perform such a conversion, the mechanism may approximate various identifiers using a machine learning component or service. For example, an identifier may include a layout identifier such as various shapes (e.g. rectangle, circle, etc.), line, or other identifier to divide (or delimit) various layout portions of a page. In addition, the mechanism may recognize various content identifiers such as text, symbols, shapes, etc., that specify the type of content (e.g. text, image, etc.) to be included in each of the specified portions of the layout. For example, the hand-drawn layout may include one or more boxes that include various text or symbols. Accordingly, the mechanism may recognize the text or symbols as content identifiers specifying particular types of content to be included in the template and the boxes as sections identifiers determining the positions of the specified content.

The determined (or approximated) identifiers may then be automatically provided to the automation building tool, which in turn, automatically converts the information into a desired structure or code (e.g. HTML). The visual components corresponding to the resulting code may then by displayed by the automation building tool as a working template (e.g. email template). This template may then be edited and incorporated into an automated program or procedure.

Accordingly, the mechanism may provide the ability for a user (e.g. non-developer) to forego the potentially tedious process of building a template within the automation building tool using a programming language or visual tools. Instead, a user may hand-draw a layout for a template (e.g. email template) which then may be uploaded and automatically converted into working programing code (e.g. HTML). Thus, the complexity for creating such a template is greatly reduced. Moreover, the mechanism opens up the development process to a potentially greater set of users that may otherwise not be familiar with creating a program within a programming environment.

Accordingly, described is mechanism for an efficient and user-friendly mechanism for automatically converting an image into a template for a document. It should be noted that, in some embodiments, the mechanism performs a conversion of a hand-drawn image (e.g. non-digital image) into visual programming logic presented within an automation building tool. Accordingly, in some embodiments, the processes described herein that perform such a conversion are necessarily rooted in computing technology. Moreover, such processes may rely and various computing components including, but not limited to, a scanner, camera, machine learning components, and a software building tool. As further described herein, such a mechanism may be provided within an operating environment as described in FIG. 1.

FIG. 1 is a block diagram illustrating an example overview of an operating environment 10 for converting an image to a template for an automation building tool according to one or more embodiments of the disclosure.

As shown, a general overview of operating environment 10 may include a user system 12, a system 160, which may include an on-demand database services system (or platform) 16, and a marketing platform 190, which may all interact via a network 14. The network may be any type of wired or wireless network including a local area network (LAN), a wide area network (WAN), or a direct communication link, or other suitable connection.

As further described herein, the user system 12 may include a computing device (e.g. computer, smartphone, etc.). As shown in this example, the user system 12 may include a capture device 8 such as a camera, scanner, or other component for capturing an image. As referred to herein, a captured image (or image) may include any form of digital image from any suitable source and in any suitable format (e.g. jpeg, png, gif, etc.). For example, a source may include a hand-drawn picture (e.g. on paper, or a whiteboard) that is converted into a digital format. For example, the image may be scanned into the user system 12, or may be the result of a user taking a picture of a whiteboard or sketch using the user system 12 (e.g. smartphone). Accordingly, such a captured image may then be uploaded into system 160. Alternatively, system 160 may obtain a captured image directly.

As further described herein, system 16 may provide an on-demand database service to customers. As part of, or in conjunction with, an on-demand service, the system 160 may also include a marketing platform 190. The marketing platform (or system) 190 may include various tools or components available to organizations for managing customers or potential customers. For example, the marketing platform may access customer data that may be stored as part of system 16 and perform various tasks or analysis. In one embodiment, the marketing platform may include an automation building tool 191, an AI engine 193, and various other components. It should be noted that marketing platform 190, automation building tool 191, and AI engine 193, or a combination thereof, may be part of system 16.

As further described herein, an automation building tool 191 (or building tool, or builder, or tool) may provide the ability to create a program (or automated program) in a visual manner. For example, a user (or developer) may create various templates for customers or potential customers. For example, a user may create a template for an email or webpage that may include specific customer data (e.g. obtained from system 16) as part of an automated process.

As further described herein, the AI engine 193 may perform various analysis functions. In one embodiment, the AI engine 193 may include various machine learning components to provide various services that provide results, predictions, or recommendations based on an organization's unique business processes and customer data. Accordingly, the AI engine 193 may include various services (or APIs) that may be used in conjunction with various other components. For example, as further described herein, a machine learning component (e.g. service) may be accessed to provide information used by the automation building tool 191. For example, the machine learning components may include a trained image analysis model for recognizing various identifier as further described here. Accordingly, the automation building tool 191 may obtain data provided by a machine learning component as part of the process of converting an image into a template.

As described, the automation building tool 191 may allow a user to create an automated program within a visual interface. An example of such an interface is described further herein.

FIG. 2 is a diagram 200 illustrating an example building tool interface 201 used to create a template according to one or more embodiments of the disclosure. As shown, automation building tool (e.g. automation building tool 191) may include the ability to allow a user to create a template, which in this example, is an email template. In addition, the user may be able to select the document type such as an HTML document.

It should be noted that although the examples described herein relate to an email template, any type of template is contemplated. For example, the template may correspond to any type of document (e.g. webpage, article, newsletter, etc). In addition, the conversion process may include a conversion into any number of structured formats or markup languages (e.g. HTML, XML, JSON, etc.) and programming languages.

As described, as part of a process of creating a template with the building tool, a user may import a hand-drawing of a layout, which the system may automatically convert into working code. Accordingly, in some embodiments, an interface of the building tool may provide an option to import a captured image as shown in FIG. 3.

Figure 3:
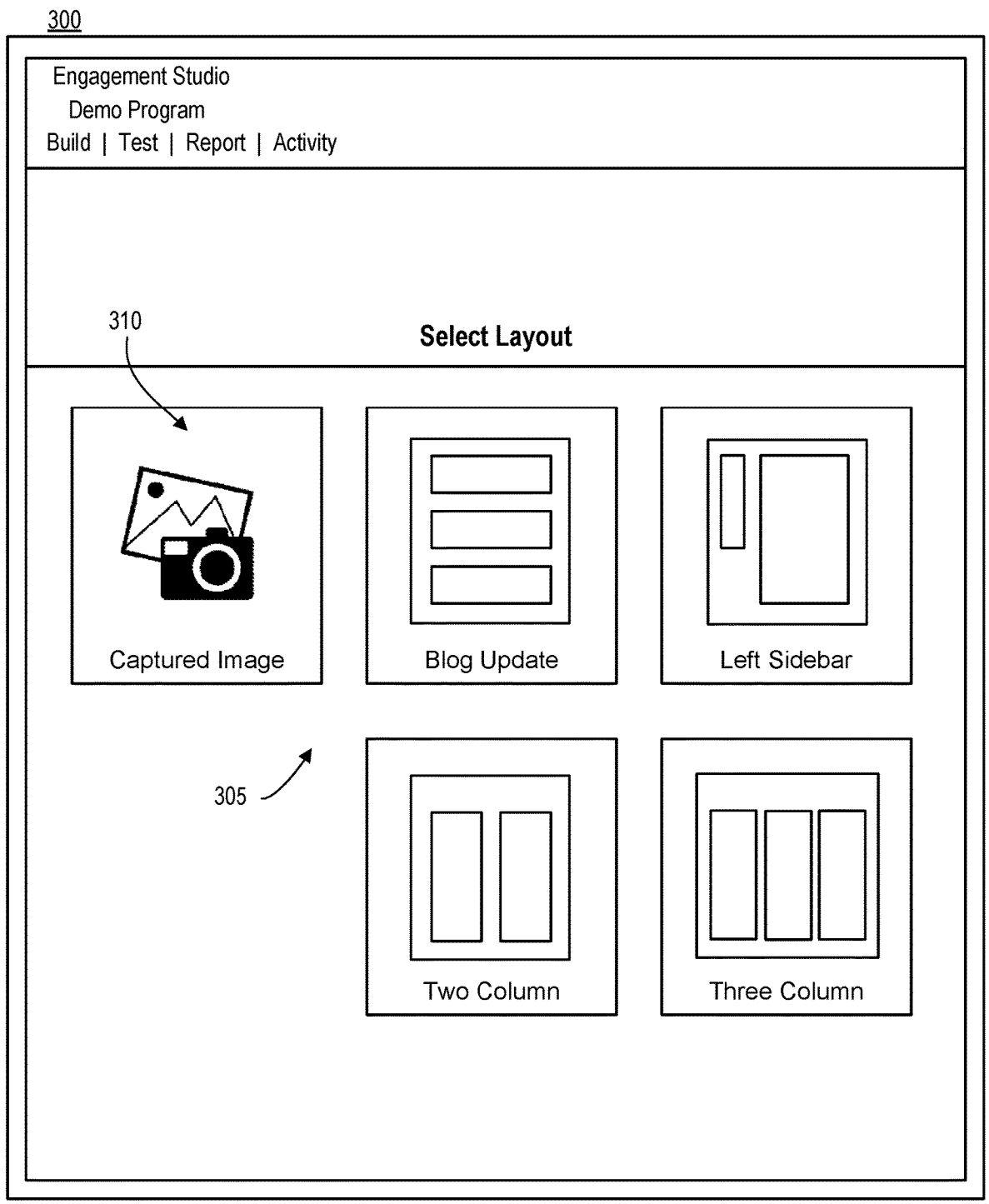
FIG. 3 is a diagram illustrating an example interface providing an option to import a captured image to be converted into a document template according to one or more embodiments of the disclosure.

FIG. 3 is a diagram 300 illustrating an example interface providing an option to import a captured image to be converted into a template according to one or more embodiments of the disclosure. As shown in this example, the system may provide a menu item including options for creating an initial layout for a template. As shown, the building tool may provide a set of preconfigured layouts 305, as well as an option to use a layout specified if a captured image 310. For example, the captured image may include a hand-drawn image. In response to selecting the option to import an image 310, the system may provide the ability to select or upload an image file (e.g. via a file explorer, or finder application, drag-and-drop operation, etc.). Accordingly, the system provides an intuitive and convenient method for a user to select an image file to be imported into the building tool. As described, the image may be of a hand-drawn layout diagram as shown in FIGS. 4A-4C.

Figure 4A:
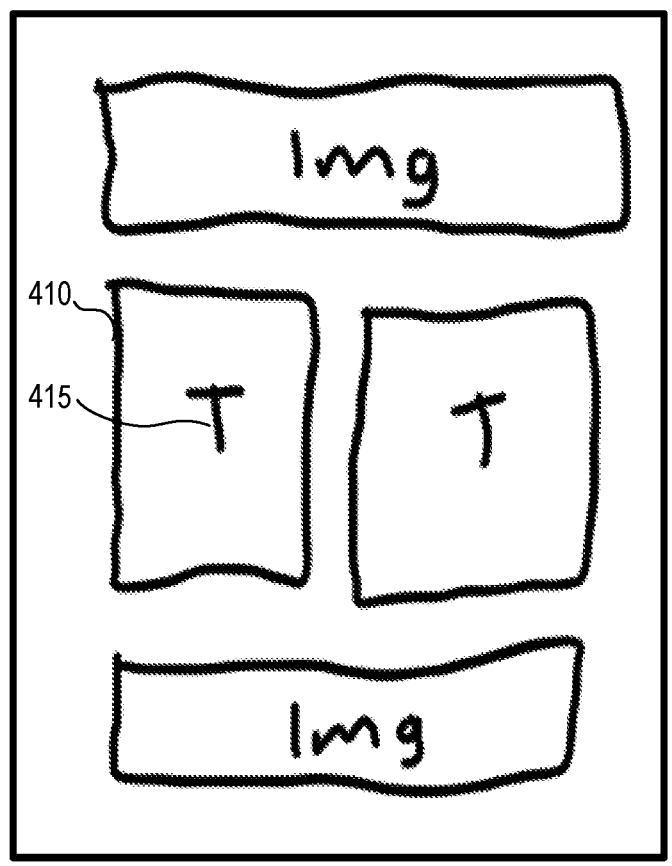
FIG. 4A is a diagram illustrating a first example of a hand-drawn layout that may be converted into a template according to one or more embodiments of the disclosure.

FIG. 4A is a diagram 400 illustrating a first example (or variation) of a hand-drawn layout that may be converted into a template according to one or more embodiments of the disclosure. As shown in this example, the section identifiers 410 may include lines to define an enclosed area or section. In this example, each section is defined by a substantially enclosed area (e.g. a rectangle, or box) that each include a content identifier 415. The content identifiers 415 in this example include text, for example, "img" (or "I" or "image", or other similar variant) to indicate an image content type and "T" (or "text", or "txt", or other variant) to identify a text content type.

Figure 4B:
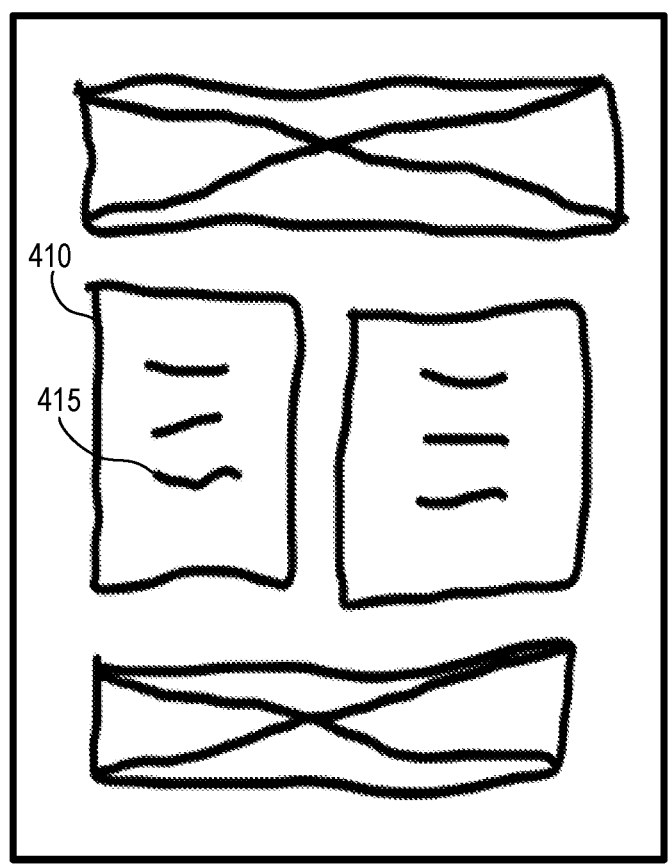
FIG. 4B is a diagram illustrating a second example of a hand-drawn layout that may be converted into a template according to one or more embodiments of the disclosure.

FIG. 4B is a diagram 402 illustrating a second example (or variation) of a hand-drawn layout that may be converted into a template according to one or more embodiments of the disclosure. As shown in this example, the section identifiers 410 may include lines to define an enclosed area or section. In this example, each section is defined by a substantially enclosed area (e.g. a rectangle, or box) that each include a content identifier 415. The content identifiers 415 in this example include symbols. For example, the "x" symbol may indicate an image content type and a lines (or squiggly lines) to identify a text content type.

Figure 4C:
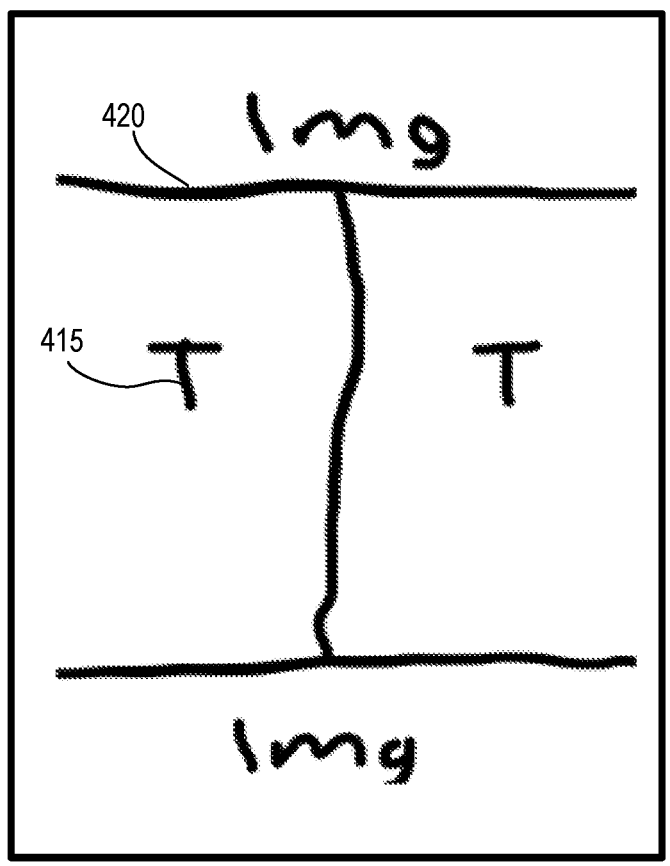
FIG. 4C is a diagram illustrating a third example of a hand-drawn layout that may be converted into a template according to one or more embodiments of the disclosure.

FIG. 4C is a diagram 404 illustrating a third example (or variation) of a hand-drawn layout that may be converted into a template according to one or more embodiments of the disclosure. As shown in this example, the section identifiers may include one or more delimiting lines 420. These delimiting lines 420 may define a section (or area) by dividing the document into sections. In addition, the layout may include content identifiers 415 that are associated with each section. As described, in this example, the content identifiers 415 may include text to indicate which sections are associated with an image content type and a text content type.

Accordingly, in operation, a user may provide (e.g. upload, share, select, etc.) a captured image of a layout (e.g. captured via a camera or scanner) to the system. In addition, in some embodiments, the user may upload additional items such as in a sample email or other images that may be converted into a template. For example, a user may come across an actual email that they may want to borrow aspects from and provide that as a sample image. Accordingly, the system may identify particular images or text within an actual email and re-create those as part of the template. In either situation, in response to a user providing such an image file, the system may perform a conversion process as further described herein, and generate a template as shown, for example, in FIG. 5A.

Figure 5A:
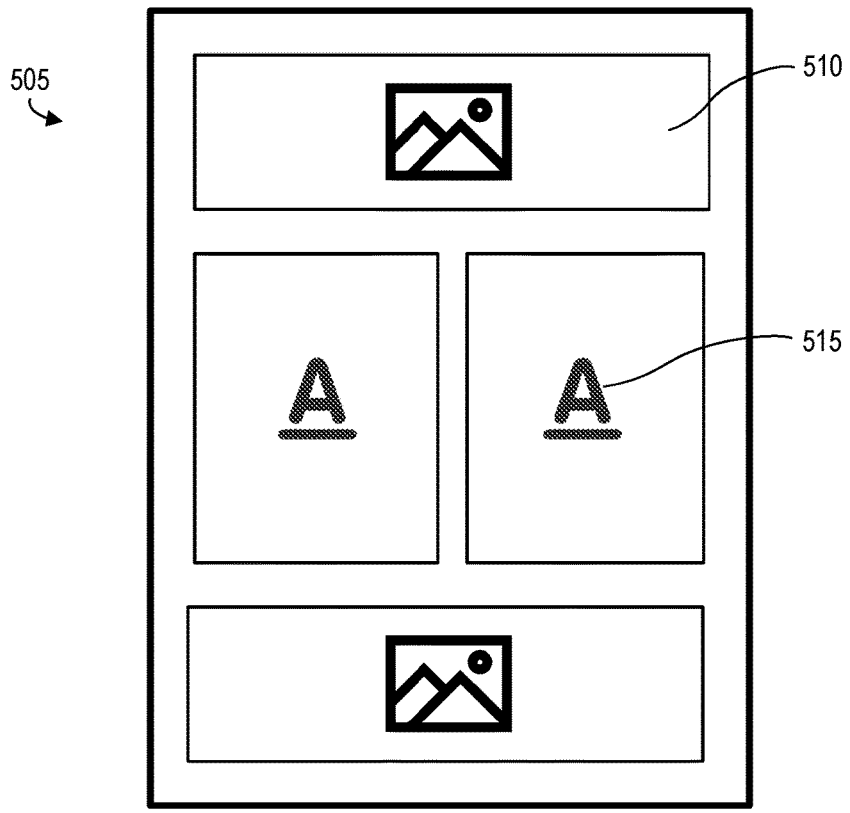
FIG. 5A is a diagram illustrating an example interface showing a visual preview after converting the image of the hand-drawn layout into a template according to one or more embodiments of the disclosure.

FIG. 5A is a diagram 500 illustrating an example interface after converting the image of the hand-drawn layouts of FIGS. 4A-4C into a template according to one or more embodiments of the disclosure.

As shown, the converted template 505 may be provided within the building tool to be finalized or further edited. As shown, the layout identifiers may be converted into a section of the template 510 and each of the sections may be associated with (or correspond to) a particular content type 515. As shown, a visual representation of the converted template 515 may be shown within the interface. In one embodiment, the generated template may include visual indicators as placeholders for content to be added by a user. Accordingly, by generating a template, the user forgoes the often tedious process of created sections using a markup language and having to position the content within a document. Instead, the user may be required only to provide the content itself (e.g. relevant images and textual context).

In addition, as described, as part of the conversion process, the system may generate the corresponding or underlying structured code (e.g. HTML) as shown in FIG. 5B.

FIG. 5B is a diagram 550 illustrating an example interface showing the resulting HTML (e.g. markup language) after converting the image of the hand-drawn layout of FIGS. 4A-4C into a template according to one or more embodiments of the disclosure. As shown, the markup language 525 (e.g. HTML) may be displayed within the building tool. Accordingly, a user may further edit or modify the generated template in a convenient and efficient manner.

Figure 6:
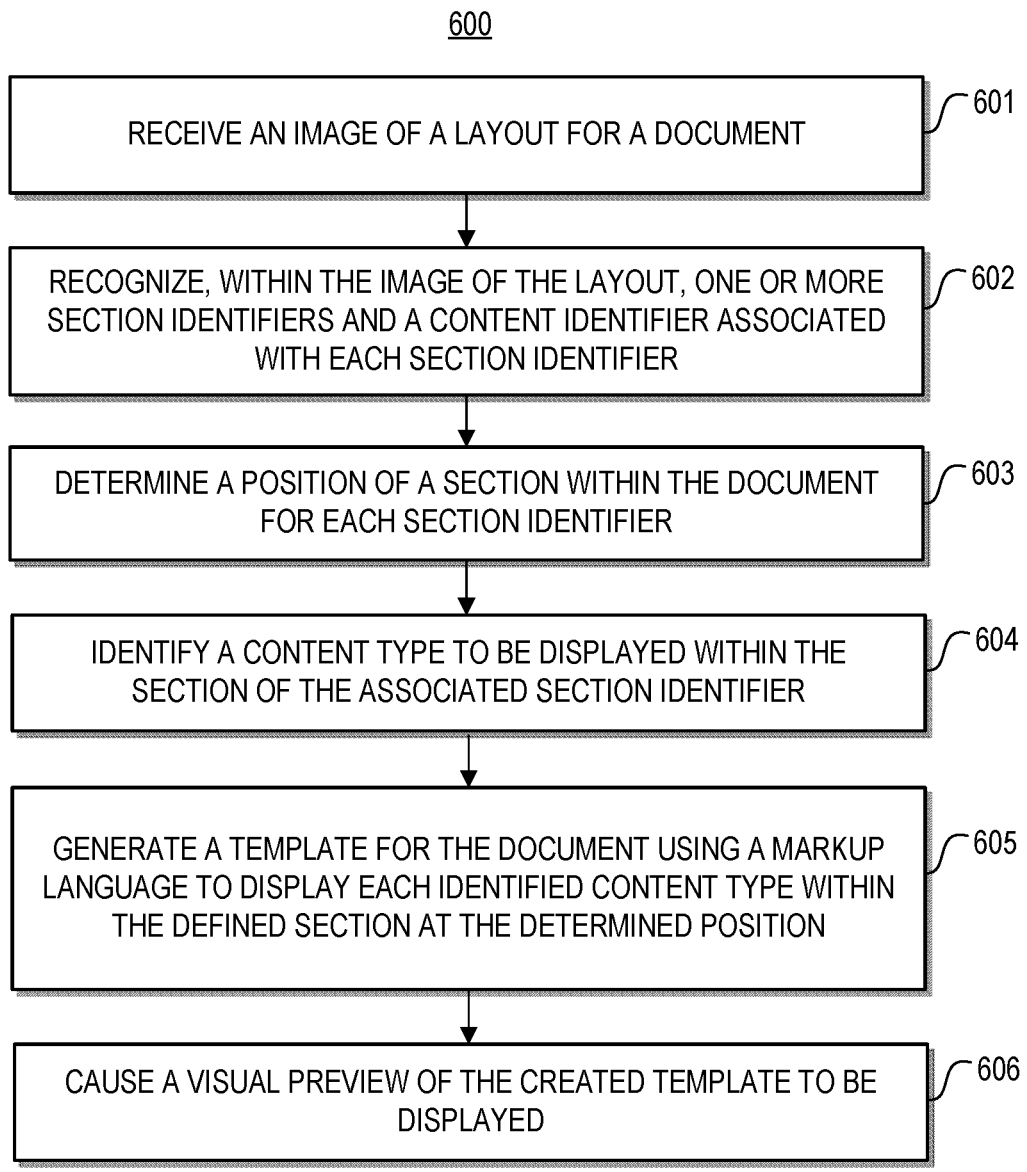
FIG. 6 is a process flow diagram illustrating an example method of converting an image into a document template according to one or more embodiments of the disclosure.

FIG. 6 is a process flow diagram 600 illustrating an example method of converting an image into a document template according to one or more embodiments of the disclosure. Process 600 may use processing logic, which may include software, hardware, or a combination thereof. For example, process 600 may be performed by a system including one or more components described in the operating environment 100 (e.g. system 160, or automation building tool 191, AI engine 193, or a combination thereof). It should be noted that the processing steps described herein may be performed in any order, and one or more of such processing steps may be performed in parallel.

In 601, the system may receive an image of a layout (or diagram, or layout diagram). For example, the image may be of a hand-drawn layout diagram. For example, the hand-drawn diagram may be captured from a layout drawn on paper, or a whiteboard, etc. In one embodiment, the layout may be used as a template for a document to be created and edited within a building tool (e.g. document editor, or automation building tool). In one embodiment, the document may be any type of document created using code or a markup language (e.g. HTML, XML, etc.). For example, the document may include any type of digitally created material or publication including an email, webpage, article, newsletter, etc. In one embodiment, the system may receive the image in response to receiving, within the automation building tool, a selection to import the image into the program. For example, the selection may specify uploading an image from amongst a selection of predefined layouts (e.g. as shown in FIG. 3). In one embodiment, a type of document (e.g. email, webpage, etc.) may be determined based on a document type identifier included in the layout, or may be determined by predicting the type of document (e.g. via a machine learning algorithm) intended to be created based on the types of identifiers provided by the user. In addition, the type of document may be provided explicitly by the user by selecting or specifying (e.g. via a menu within the automation building tool) the type of document (e.g. HTML document) for which a template is to be created.

As described, the system may leverage machine learning capabilities to approximate the specified content and corresponding layout represented in the hand-drawn image. In some embodiments, the machine learning component may be accessed via an API or service. Accordingly, in some embodiments, the system may provide the image to a machine learning service. For example, the machine learning service may apply a trained image analysis model to the image. The machine learning components may be trained using various techniques. For example, in one embodiment, the system may receive (or obtain) a set of training data including one or more labeled shapes, and a machine learning component (e.g. model) may be trained to classify elements (e.g. identifiers) within various images based on the training data.

As described, when providing a layout, a user may specify (or include) one or more identifiers describing a layout for a document. These identifiers may be part of a predefined set of identifiers or may be interpreted (e.g. via a machine learning algorithm) to predict the intent of the user. The identifiers may include section identifiers that define various sections or otherwise divide an area (e.g. page area) of the document. The identifier may include various shapes (e.g. rectangle, circle, etc.), lines, text, symbols, or other identifiers to divide (or delimit) various sections of a document. In addition, the layout may include content identifiers such as text, symbols, shapes, or other identifiers that specify the type of content (e.g. text, image, multimedia, or other elements) to be included in each section.

Accordingly, in 602, the system may recognize, within the image of the hand-drawn layout, one or more section identifiers and a content identifier associated with each section identifier. In one embodiment, each section identifier may define a section within the document and each content identifier may specify a content type (e.g. for the associated section). For example, a user may specify various sections and specify a particular type of content to be included in each section. For instance, at least some of the sections may be associated with at least one type of content.

When performing a recognition, the system may traverse (or analyze, or iterate through, etc.) the layout diagram using various techniques such as a top-down approach. In addition, the system may traverse the entire image at once, or may traverse the image in one or more portions. In one embodiment, the system may utilize a machine learning component (e.g. service) to execute (or perform) a recognition of various types of identifiers within the image. For example, the machine learning component may include image classification functions. Accordingly, the system may perform an approximation to determine each identifier within the layout diagram.

The content type may include content that may be included in a particular type of document such as text, an image, video, etc. In addition, a content type may include various types of elements (e.g. HTML elements) such as buttons, headings, drop down menus, hyperlinks, navigation elements, surveys (or other interactive elements), etc. For example, the content type may include any type of element that may be defined using a tag or other form of identifier predefined by the particular type of code (or markup language) used to implement the template.

As noted, identifiers may be determined based on a combination of features. For example, recognizing the one or more section identifiers and the content identifier associated with each section identifier may include applying a trained image analysis model to the image. Accordingly, the system (or machine learning component) may perform various forms of detection such as shape detection, image detection, text detection (e.g. optical character recognition), color detection, size and/or orientation detection, or a combination thereof, to identify various aspects of a layout. Accordingly, such detection information or results may be provided as output. In some embodiments, the information may be further processed by the system.

In one embodiment, determining a section may include identifying a shape or one or more lines delimiting an area within the layout, and determining a content type may include recognizing a content identifier from a predefined set of identifiers. For example, a hand-drawn layout may include one or more boxes (e.g. section identifiers) that include various text or symbols (e.g. content identifiers) specifying a type of content to be included in each section.

In one embodiment, the system may recognize lines as indicating various sections of a document. For example, the system may recognize a first section identifier based on one or more delimiting lines defining a first section within the image. For example, the one or more delimiting lines defining the first section may substantially enclose an area within the image (e.g. as shown in diagrams 400 and 402). Accordingly, the system may approximate a shape such as a rectangle or circle as defining an area. In addition, in one embodiment, the one or more delimiting lines defining the first section may substantially divide the document into a plurality of sections (e.g. as shown in diagram 404).

In one embodiment, the system may recognize a content identifier based on the position of the identifier relative to a section defined by a section identifier. For example, the system may recognize a first content identifier is associated with the first section identifier based on the first content identifier being located within a first section. For example, the system may recognize a portion of text as the content identifier. Accordingly, the system may identify the content type based on recognizing the portion of text corresponding to a particular content type.

As described, in some embodiments, the system may utilize a machine learning component (e.g. service) to perform various forms of recognition. In such embodiments, the machine learning component may provide (e.g. as output) information associated with the recognition. For example, the machine learning component may provide a listing of components detected in the image. The information may be provided in any suitable format (e.g. JSON, XML, etc.). In some embodiments, the machine learning component may also provide additional information such as information related to information that may be presented as part of or in conjunction with the template.

In 603, for each section identifier, the system may determine a position of the defined section within the document. In one embodiment, each section identifier may specify a particular section (or portion) within a template of where content is to be displayed within the document (e.g. within a page of the document). The position may be a relative position (e.g. from a top of the page) or an absolute position (x number of pixels). In addition, the position may include an alignment, spacing, margins, columns, headings, etc.

In some embodiments, the system may snap a section to a position within a grid. For example, a section, and corresponding content, may be auto-aligned, centered, evenly spaced, etc. In one embodiment, the positions may also be determined by a machine learning component. For example, the system may recognize (from previously created templates) that a user likely intended to position a particular type of content in a certain position within a document.

In 604, for each content identifier, the system may identify a content type to be displayed within the defined section. As described, each section or section identifier may be associated with a content identifier. Accordingly, the system may determine the type of content to be included in a particular section. In one embodiment, the content type may correspond to a set of predefined content types that each have one or more associated content identifiers. For example, a portion of text may include the term "text", "body", "paragraph", or various short forms (e.g. "T" or "para", etc.) to identify a text content type. As another example, the term "image", "picture", or various short forms (e.g. "I", "img", etc.) may identify an image content type. The system may also recognize various identifiers used for a particular type of markup language (e.g. HTML). For example, the system may recognize various tags (e.g. "HI" for a heading) as an identifier for various elements of a template. Accordingly, once the system has determined the intended aspects of the diagram, the system may perform a conversion process to generate (or create) a template.

In 605, the system may generate a template for the document. In one embodiment, the template may be generated using a form of structured code such as a markup language. The generated template may display each identified content type within the defined section (e.g. section/section identifier associated with the content/content identifier) at the determined position of the section (e.g. as determined in 605). For example, the markup language may comprise a Hypertext Markup Language (HTML) and the identified content types may include at least a text content type and an image content type. The values generated for the position may include measurements, spacing, alignment, etc. The template may be generated using any format used by the automation building tool such as various forms of a markup language (e.g. HTML, XML, etc.). In addition, the templated may be implemented for a particular type of programming language (e.g. JAVA, Python, C, C++, JavaScript, etc.).

In one embodiment, the system may create an HTML template that defines various sections or divisions based on the determined positions of sections and associated content. For example, the system may generate code that includes a "DIV" denotation for HTML. As another example, the generated HTML may specify a plot points (e.g. number of pixels from the top, left, etc.) to position a type of content such as an image. The generated HTML may also define the type of content (or include a placeholder) for a particular type of content to be included in each section. For example, the HTML template may include a placeholder for a content type. For example, the template may include a placeholder image or text to be edited by a user after the template is generated (e.g. during an editing/finalizing process).

In 606, the system may cause a visual preview of the created template to be displayed within a tool (e.g. HTML editor, building tool, or automation building tool). The visual preview may include a visual representation of the template generated. In one embodiment, the visual preview of the created template may be displayed within a first screen of the automation building tool (e.g. as shown in FIG. 5A), and an editable markup language preview (e.g. HTML source code preview) of the generated template may be displayed within a second screen of the automation building tool (e.g. as shown in FIG. 5B).

Accordingly, in some embodiments, described is a system that provides an efficient and user-friendly mechanism for automatically converting an image to a template within an automation building tool.

It should be noted the processing steps described herein (e.g. process 600) may be performed in any order, and one or more of such processing steps may be performed in parallel. For example, the determination of a position of each section of content (e.g. 603) may be performed at substantially the same time (or prior to, or after) as identifying the types of content (e.g. operation 604). In addition, operations may be performed together. For example, operations 603 and 604 may be performed as part of operation 602.

As described, one or more embodiments may be used in conjunction with an on-demand database service.

Figure 7:
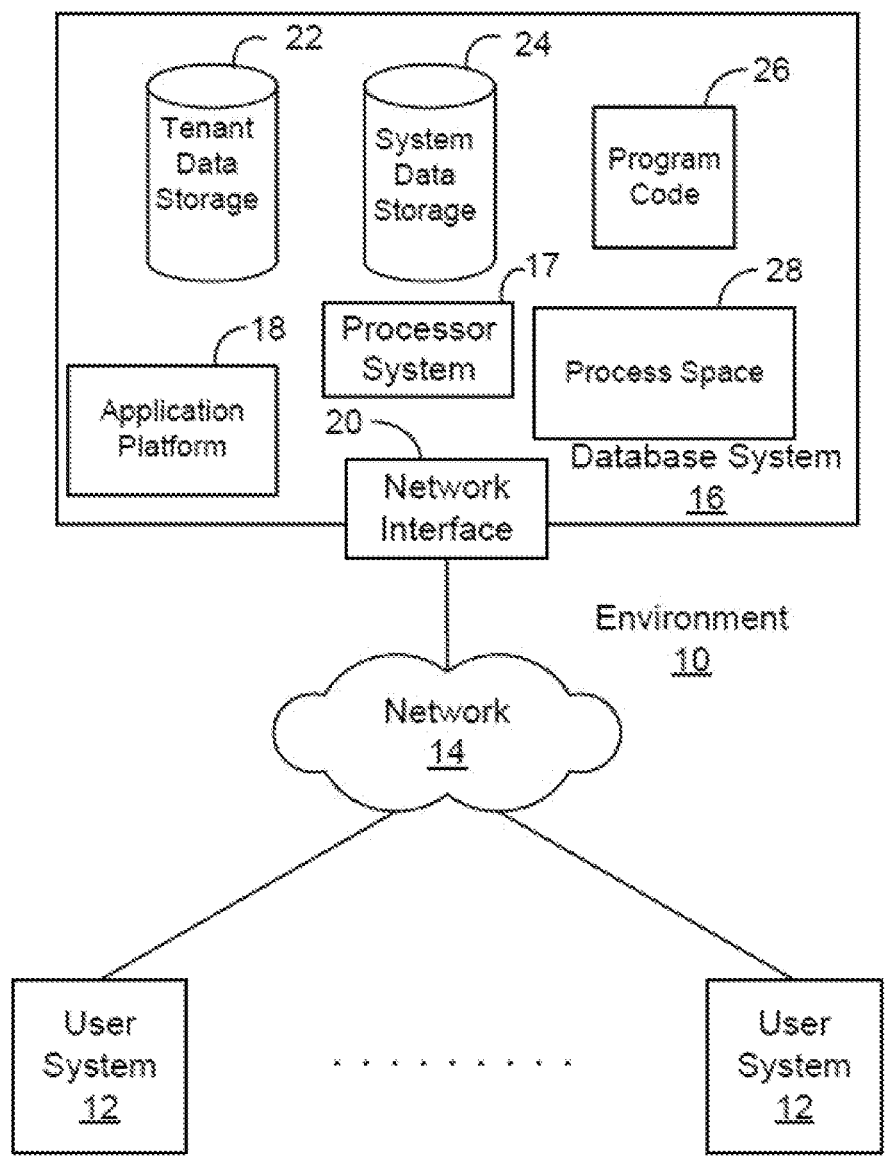
FIG. 7 is a block diagram illustrating of an example environment in which on-demand database services may be used in conjunction with one or more embodiments of the disclosure.

FIG. 7 is a block diagram illustrating of an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As shown, user systems 12 might interact via a network 14 with an on-demand database service, which is implemented, in this example, as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16 may implement a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in this example include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8:
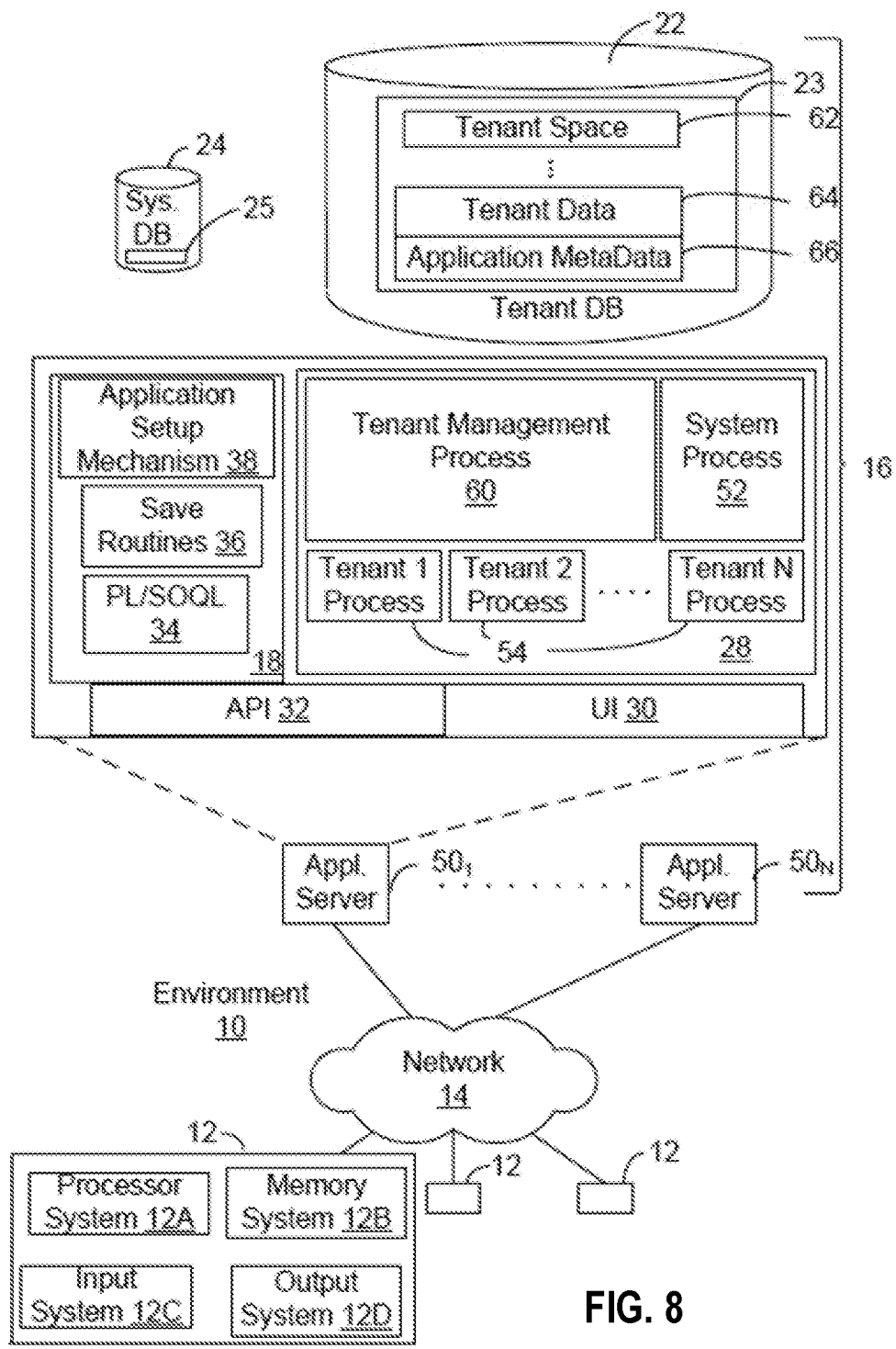
FIG. 8 is a block diagram illustrating an example of elements of FIG. 7 and various possible interconnections between these elements according to one or more embodiments of the disclosure.

FIG. 8 is a block diagram illustrating an example of elements of FIG. 7 and various possible interconnections between these elements according to one or more embodiments of the disclosure.

As shown, elements of system 16 and various interconnections in some embodiments are further illustrated. As shown, in one embodiment, the user system 12 may include processor system 12A, memory system 12B, input system 12C, and output system 12D. This example shows network 14 and system 16, and also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown in this example, system 16 may include a network interface 20 implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 9:
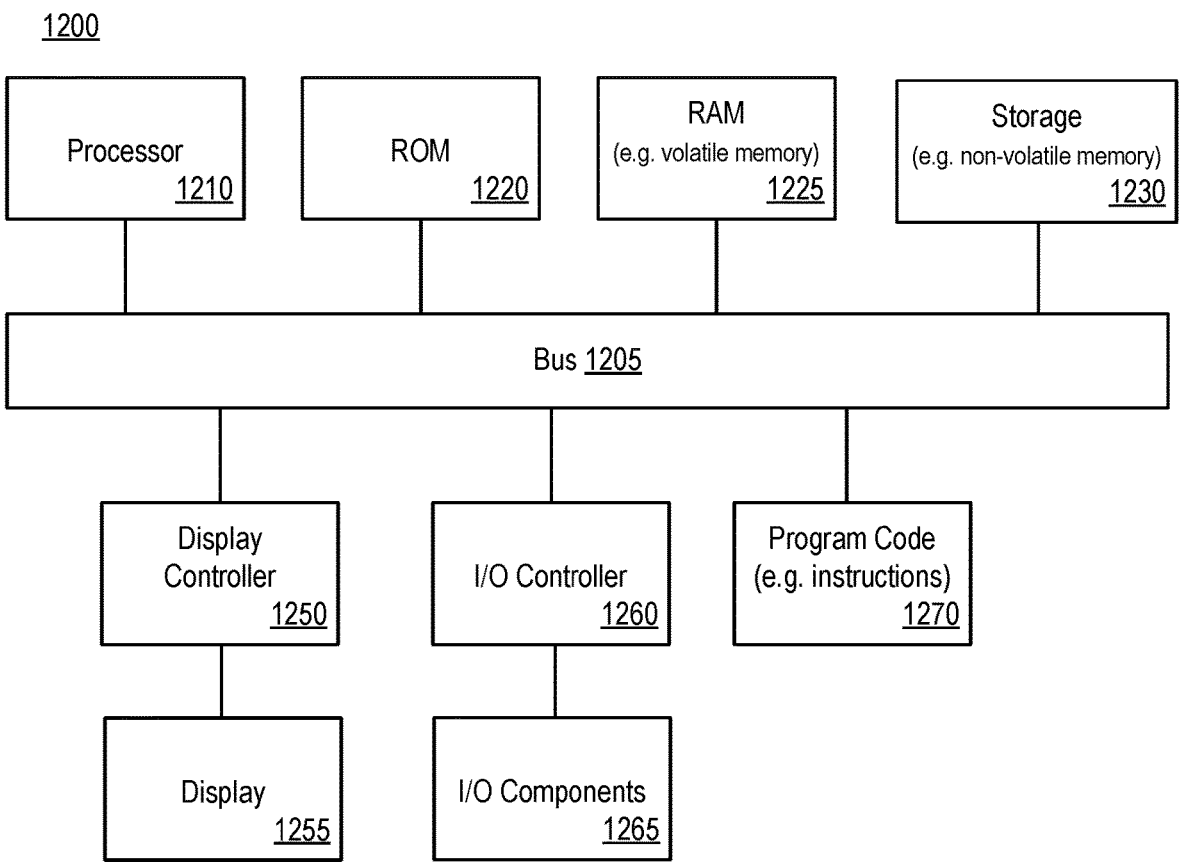
FIG. 9 is a block diagram illustrating an example of a computing system that may be used in conjunction with one or more embodiments of the disclosure.

FIG. 9 shows a block diagram of an example of a computing system that may be used in conjunction with one or more embodiments of the disclosure. For example, computing system 1200 (or system, or server, or computing device, or device) may represent any of the devices or systems (e.g. system 160, system 16, automation building tool 191, etc.) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor (or processors) 1210 may retrieve stored instructions from one or more of the memories 1220, 1225, and 1230 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. As referred to herein, for example, with reference to the claims, a processor may include one or more processors. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 may represent any of the instructions, applications, software, libraries, toolkits, modules, components, engines, units, functions, logic, etc. as described herein. Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive, by the system, an image of a hand-drawn layout to be used as a template for a document;
   recognize, within the image of the hand-drawn layout, one or more section identifiers and a content identifier associated with each section identifier, each section identifier defining a section within the template for the document and each content identifier specifying a content type, the recognizing being performed by applying a trained image analysis model to the image of the hand-drawn layout;
   determine, for each section identifier, a position of the defined section within the template for the document, at least one position for at least one defined section being based on at least one previous position within a previous document template generated for a previous hand-drawn layout image or based on an automatic alignment of the at least one defined section in the image of the hand-drawn layout to the at least one position in a grid associated with the template for the document;
   identify, for each content identifier, a content type to be displayed within the defined section of the associated section identifier, at least one content type being identified based on a type of the document that is explicitly identified for the image of the hand-drawn layout by a system user or predicted by a machine-learning component that recognizes at least one content identifier and at least one section identifier in the image of the hand-drawn layout;
   generate the template for the document using a markup language to display each identified content type within the defined section at the determined position; and
   cause a visual preview of the created template for the document to be displayed within the building tool.

2. The system of claim 1, wherein the instructions to recognize the one or more section identifiers and the content identifier associated with each section identifier further include instructions to:
   recognize a first section identifier based on one or more delimiting lines defining a first section within the template for the document; and
   recognize a first content identifier is associated with the first section identifier based on the first content identifier being located within the first section defined by the one or more delimiting lines.

3. The system of claim 2, wherein the one or more delimiting lines defining the first section substantially enclose an area within the template for the document.

4. The system of claim 2, wherein the one or more delimiting lines defining the first section substantially divide the template for the document into a plurality of sections.

5. The system of claim 1, wherein the instructions to identify the content type for each content identifier further include instructions to:

recognize a portion of text as the content identifier; and identify the content type from the recognized portion of text.

6. The system of claim 1, wherein the markup language comprises Hypertext Markup Language (HTML) and the identified content types includes at least a text content type and an image content type.

7. The system of claim 1, the plurality of instructions when executed further causing the one or more processors to:
cause the visual preview of the created template for the document to be displayed within a first screen of the building tool; and
cause an editable markup language preview of the created template for the document to be displayed within a second screen of the building tool.

8. A computer program product comprising computer-readable program code to be executed by one or more processors when retrieved from a non-transitory computer-readable medium, the program code including instructions to:
receive, by the system, an image of a hand-drawn layout to be used as a template for a document;
recognize, within the image of the hand-drawn layout, one or more section identifiers and a content identifier associated with each section identifier, each section identifier defining a section within the template for the document and each content identifier specifying a content type, the recognizing being performed by applying a trained image analysis model to the image of the hand-drawn layout;
determine, for each section identifier, a position of the defined section within the template for the document, at least one position for at least one defined section being based on at least one previous position within a previous document template generated for a previous hand-drawn layout image or based on an automatic alignment of the at least one defined section in the image of the hand-drawn layout to the at least one position in a grid associated with the template for the document;
identify, for each content identifier, a content type to be displayed within the defined section of the associated section identifier, at least one content type being identified based on a type of the document that is explicitly identified for the image of the hand-drawn layout by a system user or predicted by a machine-learning component that recognizes at least one content identifier and at least one section identifier in the image of the hand-drawn layout;
generate the template for the document using a markup language to display each identified content type within the defined section at the determined position; and
cause a visual preview of the created template for the document to be displayed within the building tool.

9. The computer program product of claim 8, wherein the instructions to recognize the one or more section identifiers and the content identifier associated with each section identifier further include instructions to:
recognize a first section identifier based on one or more delimiting lines defining a first section within the template for the document; and
recognize a first content identifier is associated with the first section identifier based on the first content identifier being located within the first section defined by the one or more delimiting lines.

10. The computer program product of claim 9, wherein the one or more delimiting lines defining the first section substantially divide the template for the document into a plurality of sections.

11. The computer program product of claim 8, wherein the instructions to identify the content type for each content identifier further include instructions to:
recognize a portion of text as the content identifier; and identify the content type from the recognized portion of text.

12. The computer program product of claim 8, wherein the markup language comprises Hypertext Markup Language (HTML) and the identified content types includes at least a text content type and an image content type.

13. A method comprising:
recognizing, within the image of the hand-drawn layout, one or more section identifiers and a content identifier associated with each section identifier, each section identifier defining a section within the template for the document and each content identifier specifying a content type, the recognizing being performed by applying a trained image analysis model to the image of the hand-drawn layout;
determining, for each section identifier, a position of the defined section within the template for the document, at least one position for at least one defined section being based on at least one previous position within a previous document template generated for a previous hand-drawn layout image or based on an automatic alignment of the at least one defined section in the image of the hand-drawn layout to the at least one position in a grid associated with the template for the document;
identifying, for each content identifier, a content type to be displayed within the defined section of the associated section identifier, at least one content type being identified based on a type of the document that is explicitly identified for the image of the hand-drawn layout by a system user or predicted by a machine-learning component that recognizes at least one content identifier and at least one section identifier in the image of the hand-drawn layout;
generating the template for the document using a markup language to display each identified content type within the defined section at the determined position; and
causing a visual preview of the created template for the document to be displayed within the building tool.

14. The method of claim 13, wherein recognizing the one or more section identifiers and the content identifier associated with each section identifier includes:
recognizing a first section identifier based on one or more delimiting lines defining a first section within the template for the document; and
recognizing a first content identifier is associated with the first section identifier based on the first content identifier being located within the first section defined by the one or more delimiting lines.

15. The method of claim 14, wherein the one or more delimiting lines defining the first section substantially divide the template for the document into a plurality of sections.

16. The method of claim 13, wherein identifying the content type for each content identifier includes:
recognizing a portion of text as the content identifier; and identifying the content type from the recognized portion of text.

17. The method of claim 13, wherein the markup language comprises Hypertext Markup Language (HTML) and the identified content types includes at least a text content type and an image content type.

* * * * *